United States Patent
Theobald et al.

(10) Patent No.: US 7,496,569 B2
(45) Date of Patent: Feb. 24, 2009

(54) DATABASE ACCESS STATEMENT PARSER

(75) Inventors: Dietmar Theobald, Karlsruhe (DE);
Christian Fecht, W#alldorf (DE);
Holger Oehm, Karlsruhe (DE); Andreas Fischbach, Heidelberg (DE); Adrian Goerler, Heidelberg (DE)

(73) Assignee: SAP AG, Walldorf (DE)

( * ) Notice: Subject to any disclaimer, the term of this patent is extended or adjusted under 35 U.S.C. 154(b) by 492 days.

(21) Appl. No.: 10/651,933

(22) Filed: Aug. 29, 2003

(65) Prior Publication Data

US 2005/0050040 A1 Mar. 3, 2005

(51) Int. Cl.
*G06F 17/30* (2006.01)

(52) U.S. Cl. .................. 707/4; 707/2; 707/7; 707/8; 707/9; 707/10

(58) Field of Classification Search ............... 707/1–10, 707/100–104.1, 200–206
See application file for complete search history.

(56) References Cited

U.S. PATENT DOCUMENTS

| | | | | |
|---|---|---|---|---|
| 6,253,200 B1 * | 6/2001 | Smedley et al. | ................ | 707/4 |
| 6,338,055 B1 * | 1/2002 | Hagmann et al. | ............... | 707/2 |
| 6,438,559 B1 * | 8/2002 | White et al. | ............ | 707/103 R |
| 6,877,000 B2 * | 4/2005 | Gajda et al. | .................... | 707/3 |
| 2003/0163460 A1 * | 8/2003 | Shinn et al. | .................... | 707/3 |

* cited by examiner

*Primary Examiner*—Isaac M Woo
(74) *Attorney, Agent, or Firm*—Blakely Sokoloff Taylor & Zafman, LLP

(57) ABSTRACT

A method and apparatus for providing uniform infrastructure for accessing relational databases are described. A database access statement issued by a software application is received and parsed to determine portability of the database access statement across multiple databases. The database access statement is forwarded for execution if the database access statement is portable.

29 Claims, 9 Drawing Sheets

DATABASE ACCESS STATEMENT PARSER

FIELD OF THE INVENTION

Embodiments of the invention pertain to the fields of database access. More particularly, embodiments of the invention relate to providing uniform infrastructure for accessing relational databases.

BACKGROUND OF THE INVENTION

While developing a software application, a developer usually needs to develop the application for a particular system. In some instances, in order to ensure that the application can be executed on different platforms and systems, the developer needs to develop the application with specific characteristics of platforms and systems in mind. In addition, software applications may require database access for retrieval, modification, and manipulation of data. For example, a call center may have databases storing information about potential callers, i.e., customers, identification of experts capable of answering customers' questions, calling history, etc. It is desirable to develop a software application that is not limited to accessing a particular database, but allows multiple databases to be used with the developed application. This will provide an entity using the application, for example, the call center, with the freedom to select databases that they would like to use in conjunction with the software application.

It is desirable to develop a software application that is not limited to a particular database, but instead, allows multiple databases to be used with the developed software application. This will provide an entity using the software application, for example, the call center, with the freedom to select which database it uses in conjunction with the software application.

Developing "code," that is, a software program, that is portable across a number of databases (e.g., code that executes with equal semantics on every database out of this number) is extremely burdensome on the developer. There are no solutions currently on the market that provide the developer with tools to develop code without regard to a type of database the application will be used with, i.e., develop code that is portable across a number of databases.

SUMMARY OF THE INVENTION

A method and apparatus for providing uniform infrastructure for software accessing relational databases are described. Embodiments of the invention include receiving a database access statement issued by an application. Embodiments of the invention further include parsing the database access statement to determine whether the database access statement is portable across multiple databases and forwarding the database access statement for execution if the database access statement is portable.

BRIEF DESCRIPTION OF THE DRAWINGS

The invention is illustrated by way of example and not limitation in the figures of the accompanying drawings, in which like references indicate similar elements and in which.

DETAILED DESCRIPTION

Figure 1A:
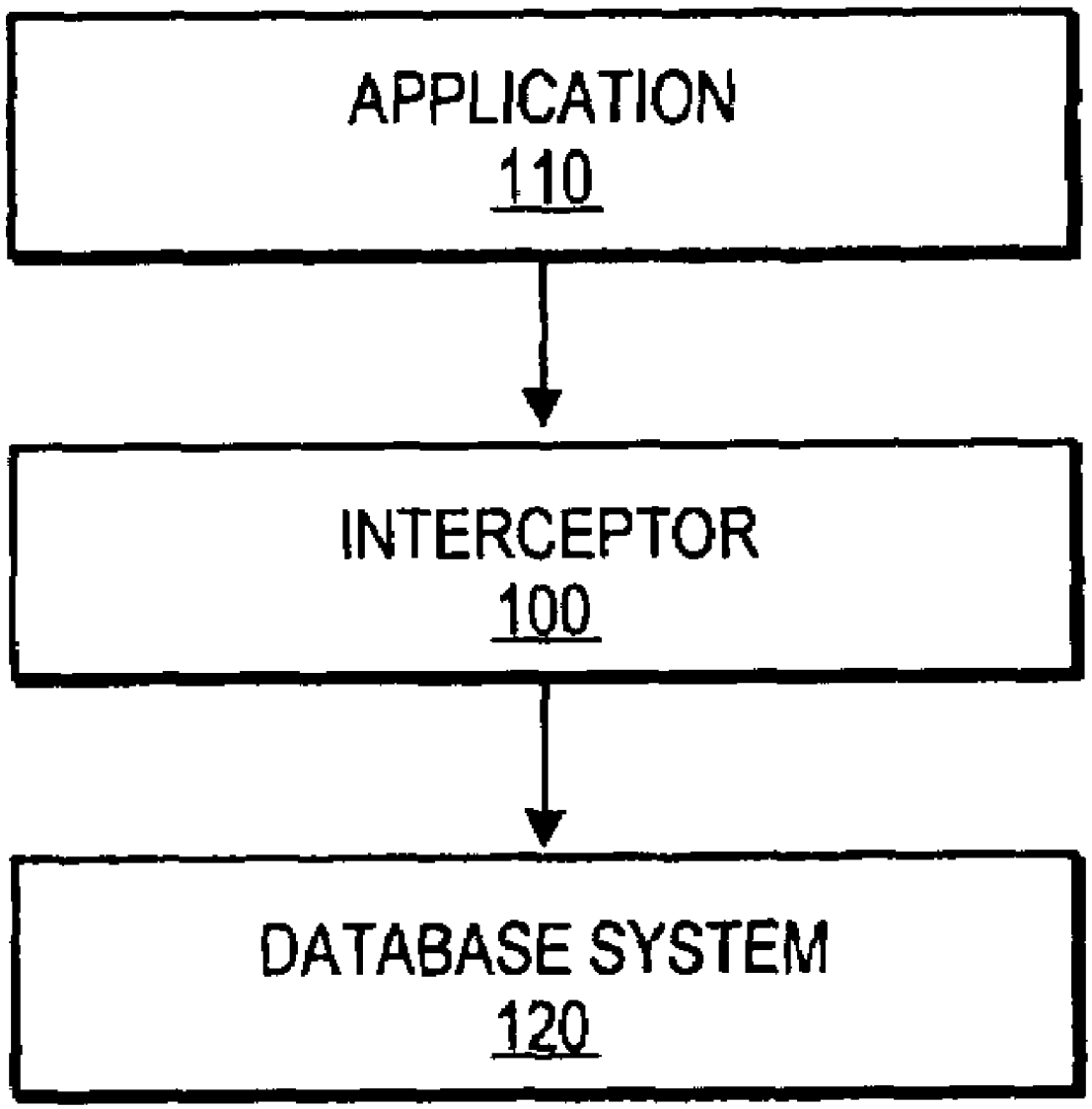
FIG. 1A illustrates an exemplary system architecture according to one embodiment of the invention.

A method and apparatus for developing software applications that are portable across a number of databases are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

In one embodiment of the invention, relational databases are used. A database is a set of related files that is created and managed by a database management system. In non-relational database systems, for example, hierarchical or network type database systems, records in one file contain pointers to records in another, such as customers to vendors and vendors to purchases. These pointers are fixed links set up ahead of time to speed up data processing.

In a relational database, relationships between files are created by comparing data, such as account numbers and names. A relational system has the flexibility to take any two or more files and generate a new file from the records that meet some criteria. Moreover, relational databases are powerful because they require few assumptions about how data is related or how it will be extracted from the database. As a result, the same database can be viewed in many different ways.

One embodiment of the invention utilizes Java Database Connectivity (JDBC). JDBC is a programming interface, developed by Sun Microsystems, that allows Java applications to access a database via the Structure Query Language (SQL). Java is an object-oriented programming language designed to generate applications that can run on all hardware platforms without modifications. SQL is a language used to access, manipulate and process data in a relational database. SQL commands can be used to interactively manipulate database entries or can be embedded within a programming language to interface a database.

One embodiment of the invention utilizes a JDBC driver. A JDBC driver is a set of classes that enables a Java application to communicate with databases. There are four types of JDBC drivers: JDBC-Open Database Connectivity (ODBC) bridge driver, native Application Programming Interface (API)-partly driver, JDBC-net pure Java driver and native protocol Java driver. The JDBC-ODBC Bridge provides JDBC access to any ODBC complaint databases through ODBC drivers. OBDC is based on a programming language C-based standard developed by the SQL Access Group, which was formed to provide common solutions to multi-vendor interoperability and portability problems. OBDC drivers are platform specific and thus compromise portability of applications forcing a developer to include a separate OBDC driver for every platform on which the application is intended to run.

The native API-partly driver is developed using native code libraries, which were originally designed for accessing databases through C/C++. A thin code of Java is wrapped around the native code that converts JDBC commands to Database Management System (DBMS)-specific native calls, which are provided by database vendors as platform-specific database libraries to be installed at client machines.

The JDBC-net pure Java driver communicates to a middleware component, which in turn connects to a database and provides database connectivity. The JDBC-net pure Java drivers map JDBC calls to middleware-specific calls.

The native protocol Java drivers, which are entirely written in Java, communicate directly with a vendor's database through socket connections. To access multiple databases a developer needs a native protocol Java driver for each database the developer intends to use.

One embodiment of the invention utilizes threads. A thread is a program's path of execution. Most programs run as a single thread, causing problems when multiple events or actions may or need to occur at the same time. Multithreaded applications address those problems that arise when it is desirable for multiple events to occur at the same time. Multithreaded applications allow several threads to run concurrently within a single program. In other words multithreading means multiple lines of a single program can be executing concurrently.

Exemplary Architecture

FIG. 1A illustrates an exemplary architecture of the described system according to one embodiment of the invention. An interceptor 100 receives database access statements issued by an application 110 and translates the queries into an appropriate format prior to providing the queries to a database system 120.

Figure 1B:
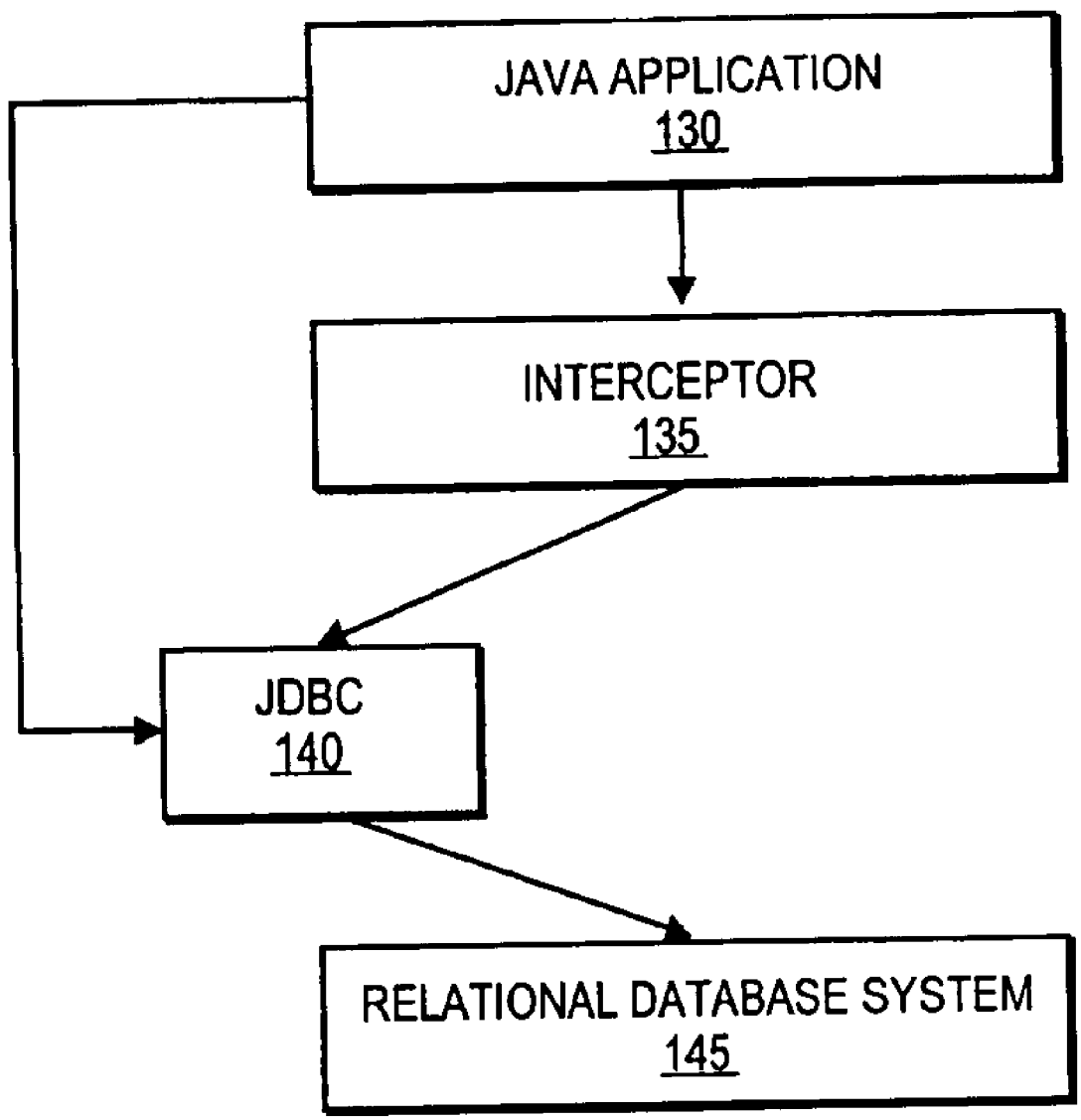
FIG. 1B illustrates an exemplary system architecture according to one embodiment of the invention.

FIG. 1B illustrates another exemplary architecture according to one embodiment of the invention. SQL statements issued by a Java application 130 are received by an interceptor 135 and provided to the relational database system 145 via a JDBC driver 140. In one embodiment SQL statements issued by the Java application 130 may bypass the interceptor and be directly transmitted to the JDBC driver 140.

Figure 2:
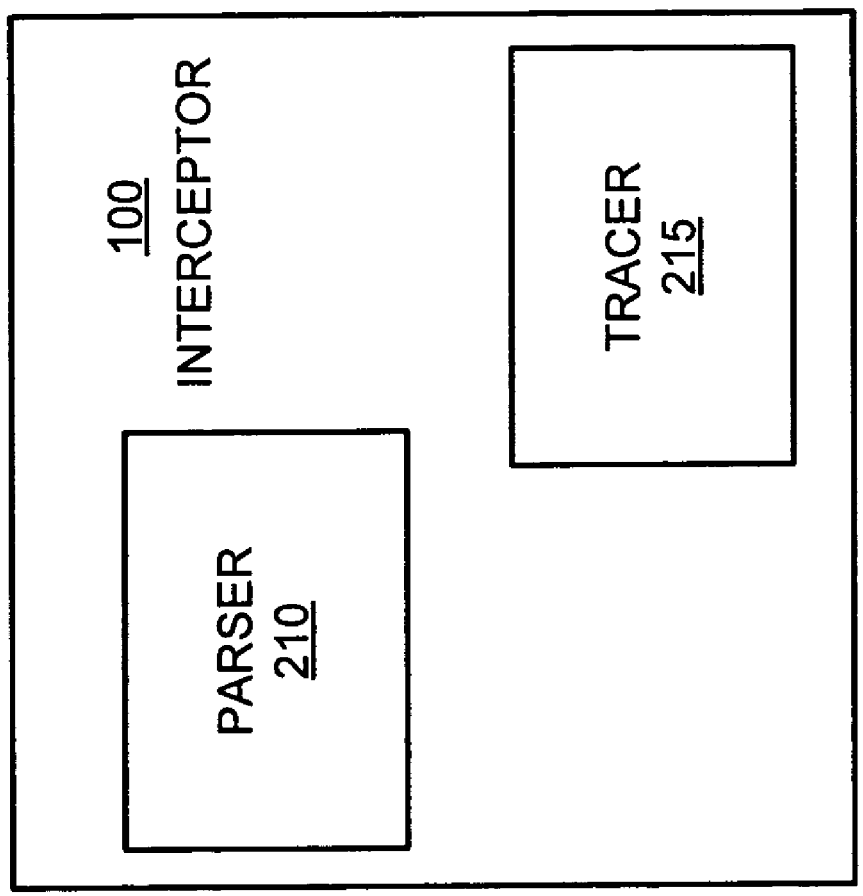
FIG. 2 illustrates components of an interceptor according to one embodiment of the invention.

FIG. 2 illustrates components of interceptors 100 and 135 according to one embodiment of the invention. Interceptors 100 and 135 include parser 210 to parse the structured query statements, or simply, query statements, and determine whether the statements are portable. Interceptors 100 and 135 may also include a tracer 215, which provides database access tracing tools for developers as described below. In an embodiment, interceptors 100 and 135 include one of parser 210 and tracer 215. In an alternative embodiment, interceptors 100 and 135 include both parser 210 and tracer 215.

Figure 3:
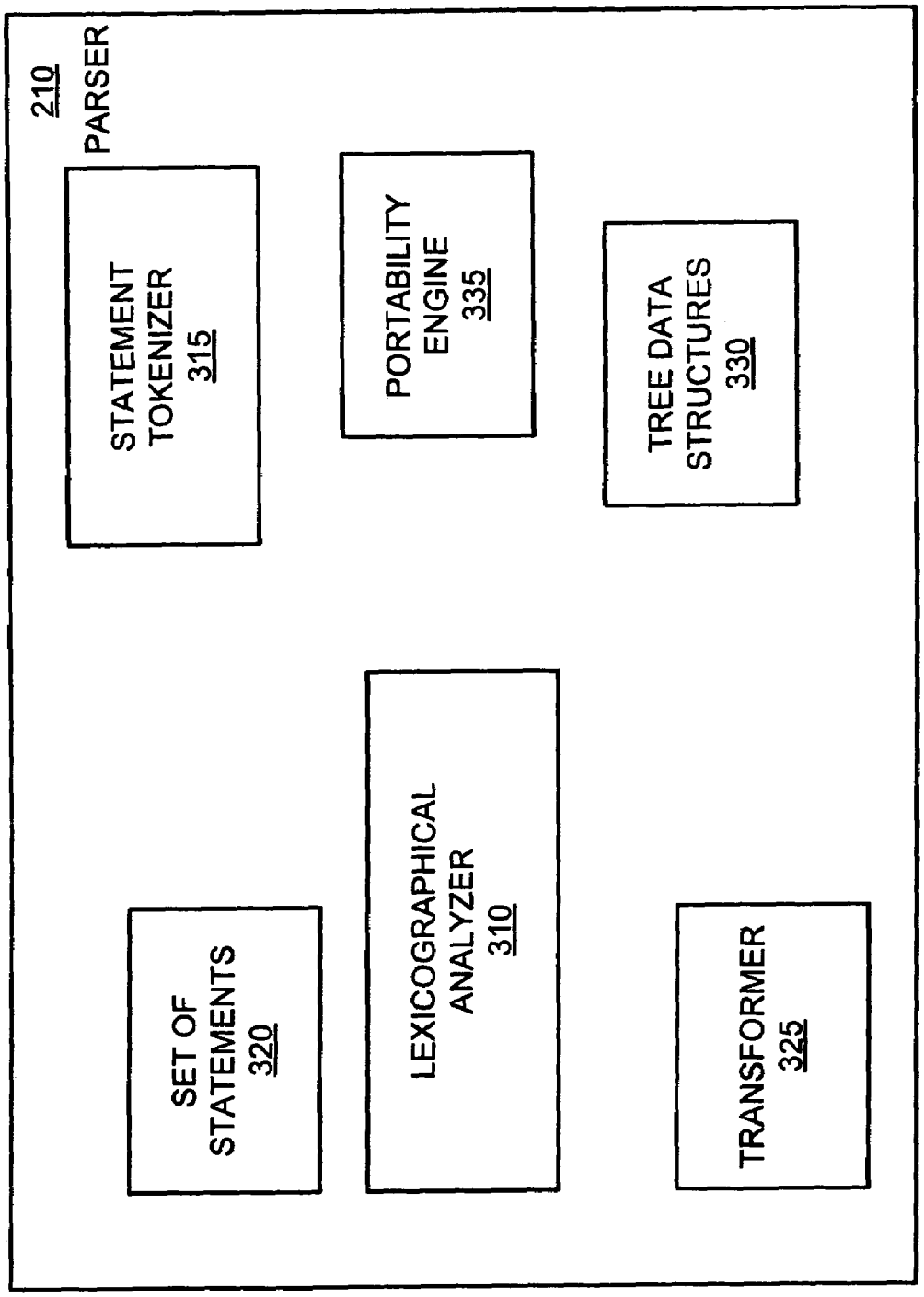
FIG. 3 illustrates components of a parser according to one embodiment of the invention.

FIG. 3 illustrates components of the parser 210 according to one embodiment of the invention. Parser 210 includes a lexicographical analyzer 310 to determine whether the syntax of a query statement is correct. Parser 210 also includes a statement tokenizer 315 to tokenize the statement as described below. Set of statements 320, transformer 325, portability engine 335 and tree data structures 330 are other components of parser 210, functions of which will be apparent from the discussion below.

Figure 4:
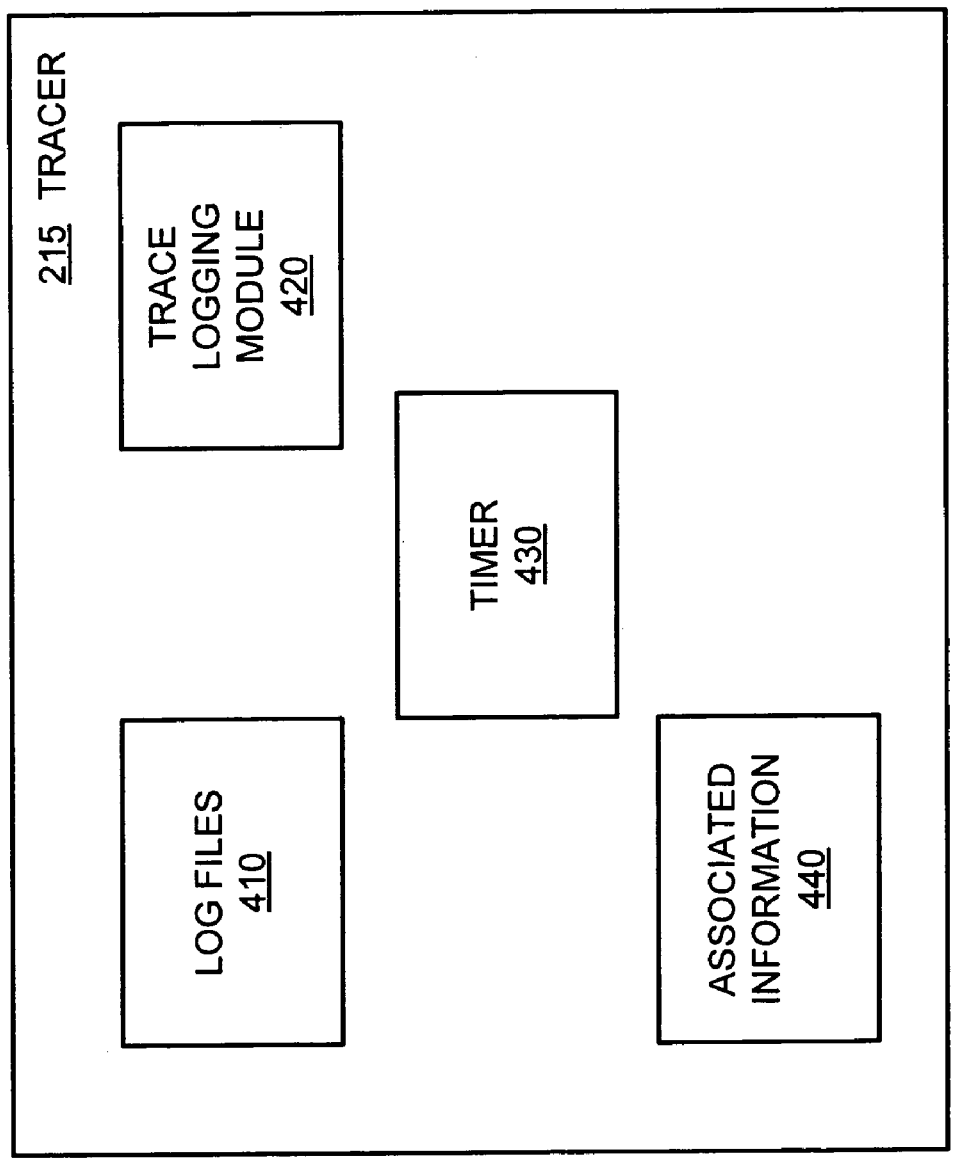
FIG. 4 illustrates components of a tracer according to one embodiment of the invention.

FIG. 4 illustrates components of tracer 215 according to one embodiment of the invention. Tracer 215 includes log files used by a trace logging module 420. A timer 430 is another component of tracer 215. Tracer 215 also includes associated information 440. Functions of these components will be apparent from the following discussion.

Methodology

With these concepts in mind embodiments of the invention may be further described.

Statement Parsing

Figure 8:
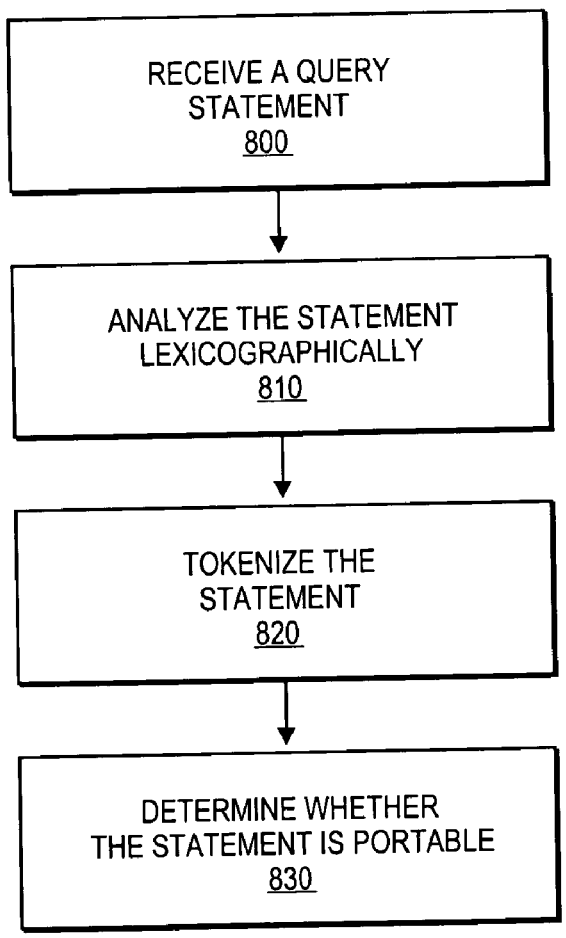
FIG. 8 is a flow diagram of a parsing process according to one embodiment of the invention.

The functions of parser 210 are described with reference to FIG. 8 according to one embodiment of the invention. At 800 the parser receives a query statement issued by the application against the database. Upon receiving the statement, the lexicographical analyzer 310 analyzes the statement lexicographically at 810 to ensure that the statement is issued in a correct format. For example, the lexicographical analyzer may check whether quotation marks are around objects that contain elements other than alphanumeric and underscore characters, and/or the SQL statement is no longer than 2,084 characters. If the statement is not in the correct format, the parser issues an error message and sends the message to the developer. If the statement is in the correct format, then the statement tokenizer 315 tokenizes the statement at 820. In one embodiment the tokenizer 315 tokenizes the statement word by word. For example, if a received statement is "Select Dept#, DepartmentName, Budget", the tokenizer 315 tokenizes the statement into tokens "Select", ",", "Dept#", ",", "DepartmentName", "Budget". Upon tokenizing the statement, the parser converts the stream of tokens to a syntax tree representation of the statement. This tree representation is checked for portability of the statement at 830.

In one embodiment of the invention, the set of statements 320 is spanned by a predefined grammar that defines the set of portable database access statements (e.g., set of statements 320, shown in FIG. 3). In an embodiment, portable statements execute on every supported database platform with equal semantics. The set includes a subset of standard SQL-92 statements, for example, statements that comply with the American National Standards Institute/International Organization or Standardization (ANSI/ISO) 9075: 1992 Information Technology—Database Languages—SQL standard (hereinafter, the SQL-92 Standard). In addition, the set includes general SQL statements, complex or simple, that can be issued against multiple databases without modifying database interfaces. An example of such a statement is, "SELECT col FROM dbtab WHERE key=7 FOR UPDATE."

To determine the portability of the statement, the portability engine 335 accesses the tree data structures 330 according to one embodiment of the invention. The tree data structures 330 include a tree representation for every statement in the set of statements 320. In an embodiment, for every statement in the set of statements 320 there is a tree representation in the tree data structure 330.

In one embodiment, determining the portability of a database access statement may be described as a three-step process: tokenizing a received database access statement, representing the tokenized database access statement in a tree data structure to check whether the syntax of the tokenized statement is portable, and traversing the tree data structure to ensure semantic validity of the database access statement. In an embodiment, referring to a database access statement as "portable" means that the statement is syntactically and/or semantically valid for a number of databases.

Figure 9:
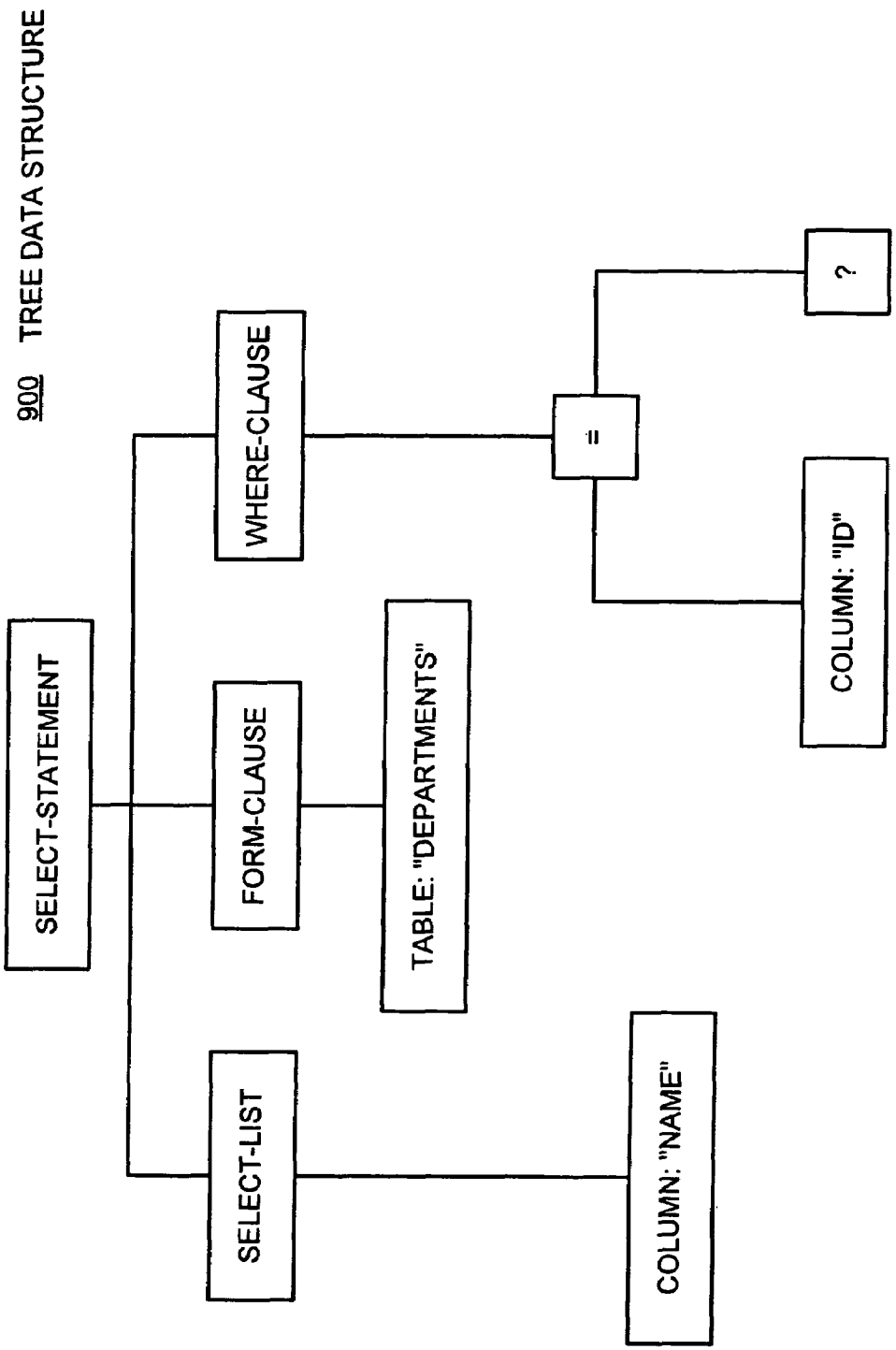
FIG. 9 illustrates an exemplary tree data structure 900.

A tokenized database access statement may be represented by a tree data structure. FIG. 9 illustrates an exemplary tree data structure 900 representing the database access statement, "SELECT name FROM departments WHERE id=?." Exemplary tree data structure 900 is compared to tree data structures 330. In an embodiment, if tree data structure 900 matches at least one of the data structures in tree data structures 330, then tree data structure 900 represents a database access statement that is not limited to accessing a particular database. The term syntax refers to the rules governing the structure of a statement. Referring to a database access statement as being "syntactically correct," means that the database access statement has a structure that is not limited to accessing a particular database.

In an embodiment, if tree data structure 900 is syntactically correct, it is checked for semantic correctness. The term "semantic correctness" refers to whether a database access statement is logically valid for a number of databases. In an embodiment, whether a database access statement is semantically correct is determined by spanning the tree data structure representing the database access statement to check for compliance with a predetermined set of semantic rules. If the tree data structure complies with the predetermined set of semantic rules, then the semantics of the database access statement represented by the tree data structure are valid for a number of databases.

In one embodiment, if a tree representation is found for the database access statement received by the interceptor, and the portability engine 335 identifies this statement as portable, the statement is then declared portable by the parser and it is executed against the database. If the statement is not portable, i.e., a tree representation for the statement was not found, or portability engine 335 does not identify the statement as portable, the parser transmits an error notice to the developer of the application or to the user of the application if the parser is invoked at runtime.

In one embodiment of the invention, if the statement is not portable, the transformer 325 may transform the statement to a portable statement performing the same function as the original database access statement. Upon transformation, the statement is then executed against the database.

In one embodiment, static SQL statements are parsed at application design time. Dynamic SQL statements, in contrast, are parsed at application run time. The parser has access to a description of the schemata of the available databases and thus there is no need to be connected to a database at design time in order to determine whether a static statement is portable.

Tracing Function

In one embodiment of the invention, an execution of a database access statement is traced to provide execution information to developers of the application to identify SQL statements. The execution information may include data about the duration of the execution of a single statement, data about any errors that occurred during the database access, etc. The collected execution information may allow the developer to enhance the application, by for example, determining whether usage of an index to the database rather than relations will render a more efficient database access process.

The functionality of the tracer is described with reference to FIG. 6 according to one embodiment. At 600 the tracer receives a request to trace a database access statement. The request to start the trace may be associated with the statement itself, for example, in a form of a ticket, i.e., metadata transmitted with the statement. The request to trace the statement may also be submitted separately prior to submission of the statement itself. Alternatively, every application call that requires database access may be traced. JDBC Application Programming Interface (API) may be used to determine which calls may access databases. One skilled in the art will appreciate that the invention is not limited to the requests to trace described above, and other methods may be used to submit a request to start a trace of a database access statement.

At 610 the trace logging module 420 starts a log file to store tracing information and starts a timer at 620 to calculate the amount of time that elapses from the submission of the statement to the return of the result from the database. In order to provide enough information to the developer to use the tracing details, the tracing module obtains information relating to the statement at 630 and creates a record in the log file including statement related information such as developer identification, application identification, identification of a module issuing the database access statement, etc. In one embodiment this related information is submitted along with the database access statement. In another embodiment the related information is retrieved from a database. In this database, the related information may be stored by identification of issued database access statements. In yet another embodiment, the database access statement may be executed as part of a thread including metadata, which in turn comprises all the related information.

Tracer 215 monitors execution of the database access statement and enters the details of the execution into the log file at 640. The information entered into the log file may include the exact start time of the submission of the database access statement, the name of a module that issued the database access statement, the duration of the database access execution, the result data size, an identification of a thread executing the JDBC method, results returned by the JDBC method call, the executed SQL statement, the parameters given to the JDBC method, an error code in case of an SQL exception or JDBC method execution exception. In one embodiment the tracing information is written in an Extensible Markup Language (XML) format.

Figure 6:
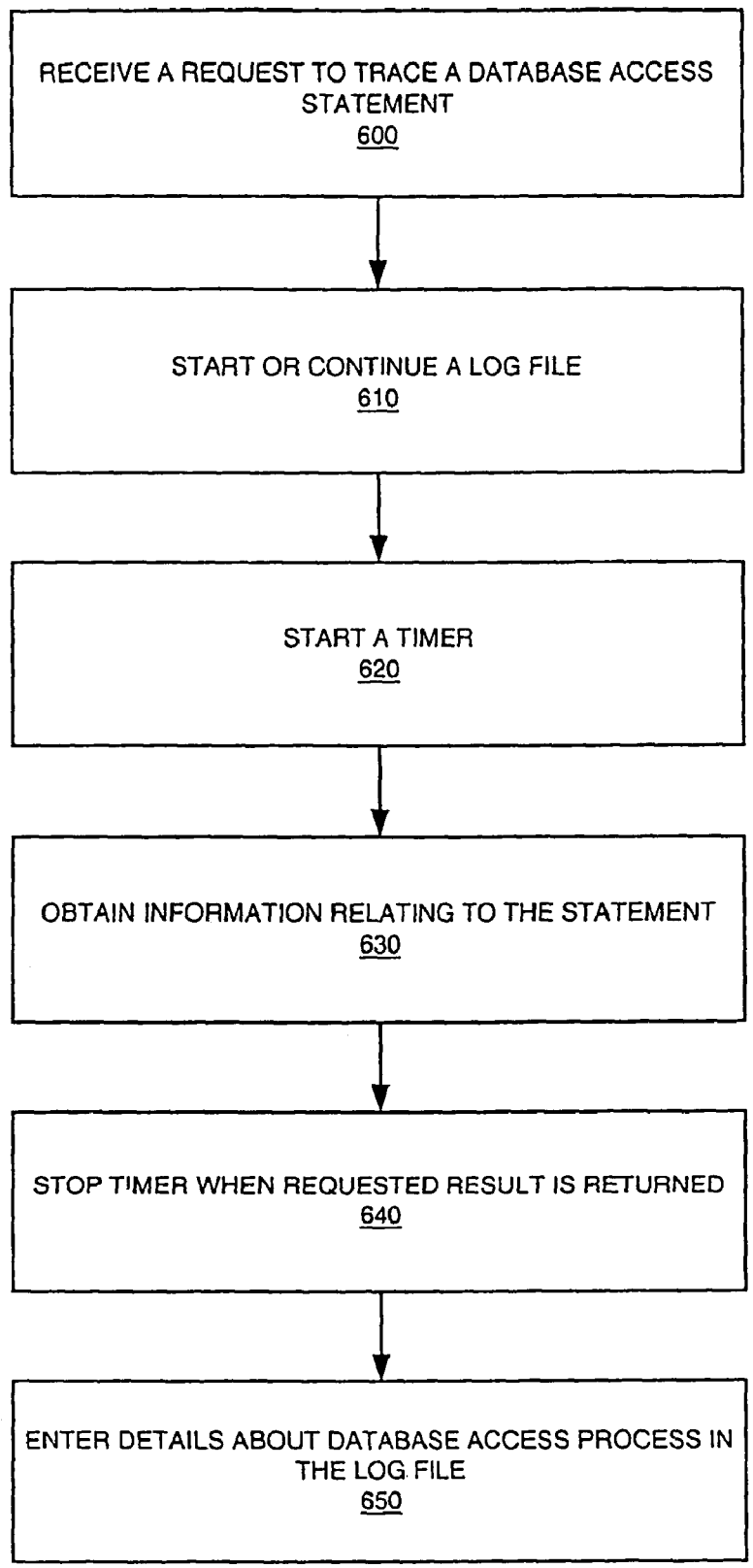
FIG. 6 is a flow diagram of a tracing process according to one embodiment of the invention.

At 650 of FIG. 6, tracer 215 stops the timer when request result is returned to the application. The duration of database access process is recorded in the log file. Tracer 215 may also stop the timer if, for example, a Java exception is thrown during the database access (and/or during the JDBC method call).

In one embodiment there are ten log files, each capable of storing 10M bytes of data. Log files are periodically purged. If all ten log files contain tracing information and a new trace is requested, one of the log files containing the oldest trace information is purged in order to allocate the space for recording of the new trace data.

Figure 7:
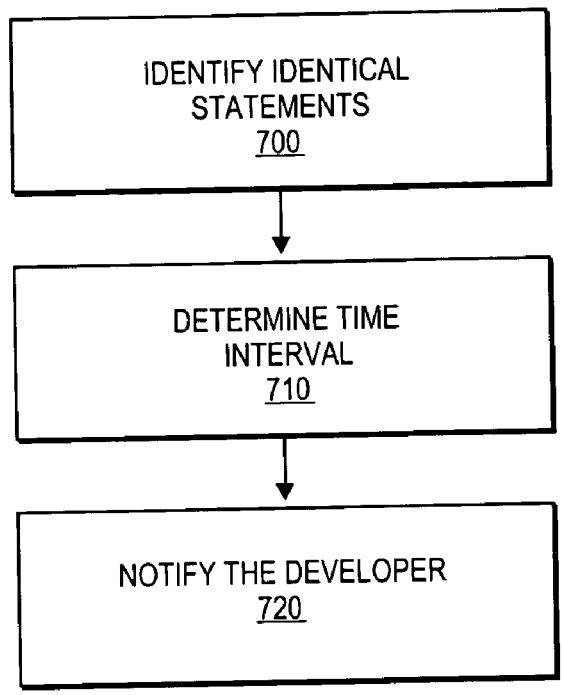
FIG. 7 is a flow diagram of a process of identification of identical statements according to one embodiment of the invention.

In one embodiment of the invention, tracer 215 identifies identical statements that are issued several times in different places of the application. At 700 of FIG. 7, tracer 215, upon receiving a request to trace a database access statement, determines whether identical statements have been executed before by searching log files. If identical statements are found in the log files, at 710 tracer 215 determines how long ago each identical statement has been executed. If during a predefined time interval several identical statements were executed, tracer 215 notifies the developer of the application that the statement may be considered for caching at the interceptor for faster and more efficient database access.

Once the tracing results are available for review by the developer, the developer may be presented with an interface containing all the collected data in, for example, a table format. The developer is then able to analyze the data, debug any errors, determine more efficient method of accessing databases, etc.

CONCLUSION

It will be recognized that many of the features and techniques described above may be implemented in software. For example, the described operations may be carried out in a processing system in response to its processor(s) executing sequences of instructions contained in memory of the device. The instructions may be executed from a memory such as RAM and may be loaded from a persistent store, such as a mass storage device, and/or from one or more other remote processing systems. Likewise, hardwired circuitry or firmware may be used in place of software, or in combination with software, to implement the features described herein. Thus, the invention is not limited to any specific combination of hardware circuitry and software, nor is it limited to any particular source of software executed by the processing systems.

Figure 5:
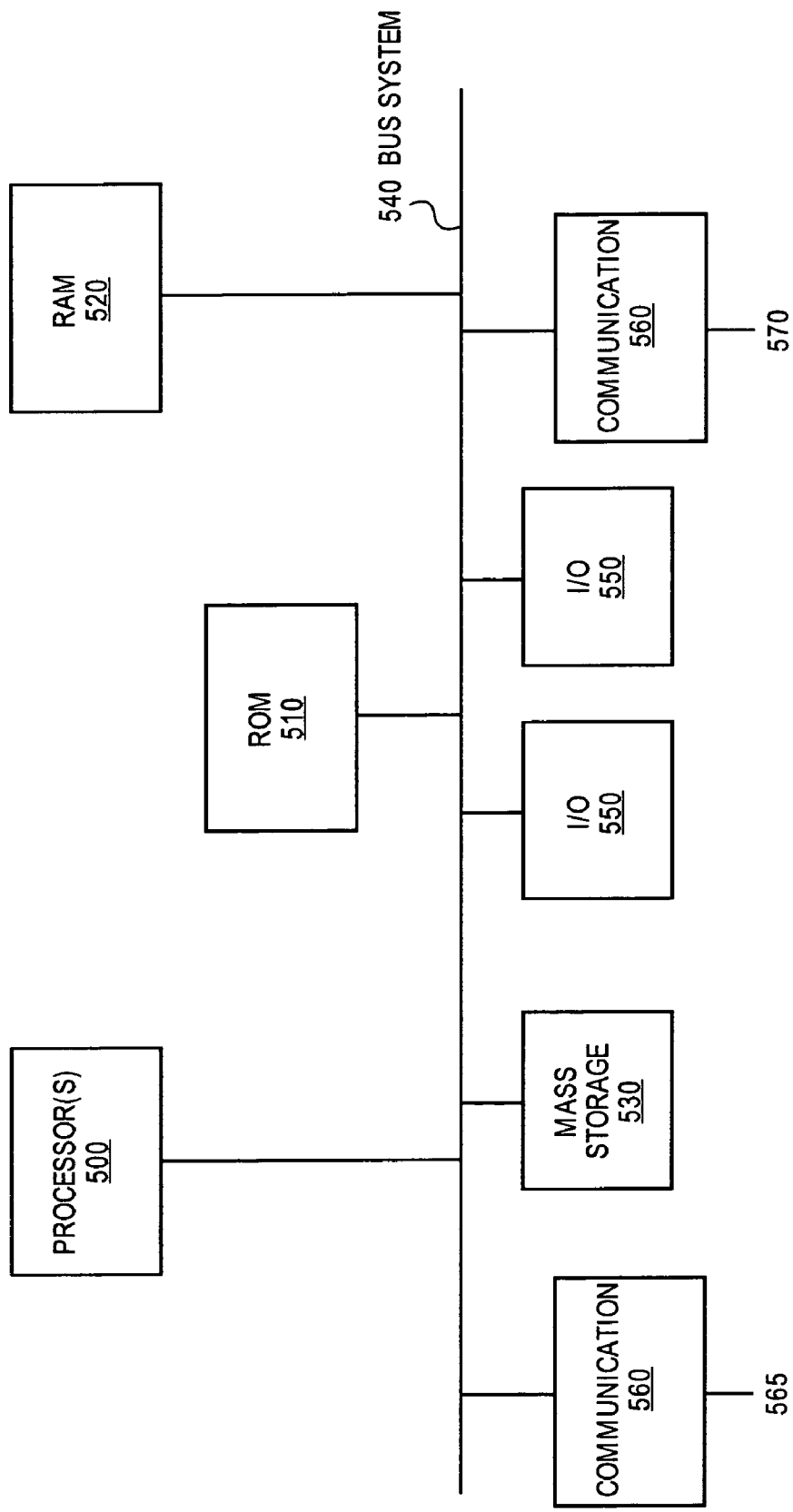
FIG. 5 illustrates an exemplary processing system according to one embodiment of the invention.

It will be appreciated that physical processing systems, which embody components of the software development tools described above, may include processing systems such as conventional personal computers (PCs), embedded computing systems and/or server-class computer systems according to one embodiment of the invention. FIG. 5 illustrates an example of such a processing system at a high level. The processing system of FIG. 5 may include one or more processors 500, read-only memory (ROM) 510, random access memory (RAM) 520, and a mass storage device 530 coupled to each other on a bus system 540. The bus system 540 may include one or more buses connected to each other through various bridges, controllers and/or adapters, which are well known in the art. For example, the bus system 540 may include a 'system bus', which may be connected through an adapter to one or more expansion busses, such as a peripheral component interconnect (PCI) bus or an extended industry standard architecture (EISA) bus. Also coupled to the bus system 540 may be the mass storage device 530, one or more input/output (I/O) devices 550 and one or more data communication devices 560 to communicate with remote processing systems via one or more communication links 565 and 570, respectively. The I/O devices 550 may include, for example, any one or more of: a display device, a keyboard, a pointing device (e.g., mouse, touch pad, trackball), and an audio speaker.

The processor(s) 500 may include one or more conventional general-purpose or special-purpose programmable microprocessors, digital signal processors (DSPs), application specific integrated circuits (ASICs), or programmable logic devices (PLD), or a combination of such devices. The mass storage device 530 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 560 each may be any devices suitable for enabling the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

Thus, a method and apparatus for portable database access are described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A computer-implemented method comprising:
    forming tree representations of a collection of database access statements that are portable across multiple databases;
    receiving a database access statement issued by a software application;
    tokenizing the database access statement into a plurality of tokens to create a tokenized access statement;
    representing the tokenized database access statement in a tree data structure;
    comparing the tree data structure with the tree representations of the collection of portable database access statements to determine whether the syntax of the database access statement is valid across the multiple databases;
    traversing the tree data structure to check for compliance with a set of semantic rules, the compliance indicating semantic validity of the data access statement across the multiple databases;
    determining the database access statement to be portable across the multiple databases in response to the syntactic and semantic validity of the database access statement across the multiple databases; and
    forwarding the database access statement to a database driver for execution against a database in response to a determination that the database access statement is portable.

2. The computer-implemented method of claim 1 wherein storing the database access statement comprises:
    analyzing the database access statement lexicographically.

3. The computer-implemented method of claim 2 wherein comparing the tree data structure comprises:
    searching the tree representations of the portable database access statements for the tokenized database access statement.

4. The computer-implemented method of claim 3 wherein the portable database access statements includes at least one of:
    database access statements established by a standard, and
    general database access statements to be used against the multiple databases.

5. The computer-implemented method of claim 1 wherein the database access statement is an SQL statement.

6. The computer-implemented method of claim 1 wherein the software application is a Java application.

7. The computer-implemented method of claim 1 wherein comparing the tree data structure further comprises:
    comparing the tree data structure at design time in response to a determination that the database access statement is static.

8. The computer-implemented method of claim 1 wherein comparing the tree data structure further comprises:
    comparing the tree data structure at run time in response to a determination that the database access statement is dynamic.

9. The computer-implemented method of claim 1 further comprising:
notifying a developer of the software application in response to the determination that the database access statement is not portable.

10. The computer-implemented method of claim 1 further comprising:
transforming the database access statement into a portable database access statement in response to the determination that the database access statement is not portable.

11. A computer-implemented method comprising:
forming tree representations of a collection of SQL statements that are portable across multiple relational databases;
receiving a Structured Query Language (SQL) statement issued by a Java application;
tokenizing the SQL statement into a plurality of tokens to create a tokenized access statement;
representing the SQL statement in a tree data structure;
comparing the tree data structure with the tree representations of the collection of portable SQL statements to determine whether the syntax of the SQL statement is valid across the multiple relational databases;
traversing the tree data structure to check for compliance with a set of semantic rules, the compliance indicating semantic validity of the SQL statement across the multiple relational databases;
determining the SQL statement to be portable across the multiple relational databases in response to the syntactic and semantic validity of the SQL statement across the multiple relational databases; and
passing the SQL statement to a Java Database Connectivity (JDBC) driver for execution against a database in response to a determination that the SQL statement is portable.

12. The computer-implemented method of claim 11 further comprising:
executing the SQL statement against the database in response to the determination that the SQL statement is portable.

13. The computer-implemented method of claim 11 wherein storing the SQL statement comprises:
analyzing the SQL statement lexicographically.

14. The computer-implemented method of claim 13 wherein comparing the tree data structure comprises:
comparing the tokenized access statement with the tree representations of the portable SQL statements.

15. The computer-implemented method of claim 14 wherein the portable SQL statements includes at least one of:
SQL statements of an SQL-92 standard, and
general statements capable of being executed against the multiple relational databases.

16. A system comprising:
data storage to store a database; and
a processing system coupled to the data storage, the processing system to form tree representations of a collection of database access statements that are portable across multiple databases, to receive a database access statement issued by a software application, to tokenize the database access statement into a plurality of tokens to create a tokenized access statement, to store the database access statement in a tree data structure, to compare the tree data structure with the tree representations of the collection of portable database access statements to determine whether the syntax of the database access statement is valid across the multiple databases, to traverse the tree data structure to check for compliance with a set of semantic rules, wherein the compliance indicates semantic validity of the data access statement across the multiple databases, to determine the database access statement to be portable across the multiple databases in response to the syntactic and semantic validity of the database access statement across the multiple databases, and to forward the database access statement to a database driver for execution against the database in the data storage in response to a determination that the database access statement is portable.

17. The system of claim 16 wherein the processing system to compare the tree data structure comprises the processing system to search the tree representations of the portable database access statements for the tree data structure of the database access statement.

18. The system of claim 16 wherein the processing system to store the database access statement comprises the processing system to lexicographically analyze the database access statement.

19. The system of claim 18 wherein the processing system to compare the tree data structure further comprises the processing system to compare the tokenized access statement with the tree representations of the portable database access statements to determine portability of the database access statement.

20. The system of claim 16 wherein the software application is a Java application.

21. The system of claim 16 wherein the database access statement is a Structured Query Language statement.

22. A machine-readable medium having stored therein instructions which, when executed by a processor, cause a processing system to perform a method comprising:
forming tree representations of a collection of database access statements that are portable across multiple databases;
receiving a database access statement issued by a software application;
tokenizing the database access statement into a plurality of tokens to create a tokenized access statement;
storing the database access statement in a tree data structure;
comparing the tree data structure with the tree representations of the collection of portable database access statements to determine whether the syntax of the database access statement is valid across the multiple databases;
traversing the tree data structure to check for compliance with a set of semantic rules, the compliance indicating semantic validity of the data access statement across the multiple databases;
determining the database access statement to be portable across the multiple databases in response to the syntactic and semantic validity of the database access statement across the multiple databases; and
forwarding the database access statement to a database driver for execution against a database in response to a determination that the database access statement is portable.

23. The machine-readable medium of claim 22 wherein the instructions which, when executed by a processor, cause the processing system to store the database access statement further cause the processing system to lexicographically analyze the database access statement.

24. The machine-readable medium of claim 23 wherein the instructions which, when executed by a processor, cause the processing system to compare the tree data structure further cause the processing system to compare the tokenized access statement with the tree representations of the portable database access statements.

25. The machine-readable medium of claim 22 wherein the software application is a Java application.

26. The machine-readable medium of claim 22 wherein the database access statement is an SQL statement.

27. A system comprising:
   data storage to store a database; and
   a processing system coupled to the data storage, the processing system comprising:
      means for forming tree representations of a collection of database access statements that are portable across multiple databases;
      means for receiving a database access statement issued by a software application;
      means for tokenizing the database access statement into a plurality of tokens to create a tokenized access statement;
      means for storing the database access statement in a tree data structure;
      means for comparing the tree data structure with the tree representations of the collection of portable database access statements to determine whether the syntax of the database access statement is valid across the multiple databases;
      means for traversing the tree data structure to check for compliance with a set of semantic rules, the compliance indicating semantic validity of the data access statement across the multiple databases;
      means for determining the database access statement to be portable across the multiple databases in response to the syntactic and semantic validity of the database access statement across the multiple databases; and
      means for forwarding the database access statement to a database driver for execution against a database in response to a determination that the database access statement is portable.

28. The system of claim 27 wherein means for storing the database access statement comprises means for lexicographically analyzing the database access statement.

29. The system of claim 27 wherein the means for comparing the tree data structure comprises means for comparing the tokenized access statement with the tree representations of the portable database access statements.

* * * * *